(12) United States Patent
Ohomori

(10) Patent No.: US 6,477,315 B1
(45) Date of Patent: Nov. 5, 2002

(54) EDIT LIST CREATING APPARATUS

(75) Inventor: Shigeru Ohomori, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/328,758

(22) Filed: Jun. 9, 1999

(30) Foreign Application Priority Data

Jun. 26, 1998 (JP) .......................................... 10-180973

(51) Int. Cl.⁷ ................................................ H04N 5/93
(52) U.S. Cl. ........................... 386/55; 345/629; 386/52
(58) Field of Search ............................. 386/52.55, 53, 386/54; 345/723, 629, 501; H04N 5/93

(56) References Cited

U.S. PATENT DOCUMENTS

| | | | | |
|---|---|---|---|---|
| 5,202,985 A | * | 4/1993 | Goyal | 345/501 |
| 5,359,712 A | * | 10/1994 | Cohen et al. | 345/723 |
| 5,760,767 A | * | 6/1998 | Shore et al. | 345/723 |
| 5,781,188 A | * | 7/1998 | Amiot et al. | 345/723 |
| 5,982,350 A | * | 11/1999 | Hekmatpour et al. | 345/629 |
| 6,134,380 A | * | 1/2000 | Kushizaki | 386/55 |

* cited by examiner

Primary Examiner—Vincent Boccio
(74) Attorney, Agent, or Firm—Crosby, Heafey, Roach & May

(57) ABSTRACT

An edit list creating apparatus that can substantially improve the work efficiency in creating an edit list is disclosed. An edit list creating apparatus that can create an edit list and that is functional during the creation of the edit list for setting the list in such a way that desired video special-effect processing is executed by displaying a mark corresponding to the video special-effect processing at a desired position of a predetermined site of the edit list, includes a display controller for displaying the mark with the predetermined display color that differs for each type of the video special-effect processing. In addition, an edit list creating apparatus that can create an edit list and that is functional during the creation of the edit list for setting the list in such a way that desired video special-effect processing is executed by displaying a mark corresponding to the video special-effect processing at a desired position of a predetermined site of the edit list, includes a display controller for displaying a mark corresponding to the video special-effect processing for which the predetermined function mode is set on, with a predetermined alarm color different from normal display colors.

6 Claims, 12 Drawing Sheets

EDIT LIST CREATING APPARATUS

BACKGROUND OF THE INVENTION

1. Field of the Invention

The present invention relates to an edit list creating apparatus and more particularly, is preferably applied to an editing apparatus adapted to create an edit list that defines edit contents used to join a plurality of registered image materials together to obtain desired edited videos.

2. Description of the Related Art

A conventional editing apparatus of this kind is adapted to create an-edit list by displaying on an edit list creating screen comprising of a graphical user interface (GUI), a time scale 100 and a-first video track 101A, an effect track 101B, and a second video track 101C that are provided along the time scale, and using mouse operations to sequentially display on the first and second video tracks 101A and 101C a first and a second frames 102A and 102B corresponding to the lengths of image materials so that the frames are continuous on the time scale 100, as shown in FIG. 1.

Such an editing apparatus is also adapted to provide settings, required to display on the effect track 101B an icon 103 corresponding to desired video special-effect processing in such a way that the first and second frames 101A and 101C are located so as to overlap each other on the time scale, thereby allowing the video special-effect processing to be executed upon switching between a first image material corresponding to the first frame 102A and a second image material corresponding to the second frame 102B.

In general, video special-effects can be classified into a transition type (for example, wipe) that switches a first video MV1 to a second video MV2, as shown in FIG. 2A and an animation type (for example, picture-in-picture) that temporarily displays the second video MV2 on the first video MV1, as shown in FIG. 2B.

The transition-type and animation-type video special-effects have different combinations of available videos; for example, the animation-type video special-effect requires that the second video MV2 lasts a shorter time than the first video MV1.

The above conventional editing apparatus, however, does not indicate whether the video special-effect corresponding to each icon 103 is of the transition or animation type, but depends only on the operator's knowledge.

Thus, such an editing apparatus has no other means but an error indication that may be provided when the operator displays the icon 103 on the effect track 101B, for determining whether the video special-effect corresponding to that icon 103 is available. In addition, if, for example, an error is indicated, the desired video special-effect must be selected again.

Furthermore, in order to improve the operator usability, the above editing apparatus may be constructed to hold parameter values or various function modes set beforehand for the video special-effect, until the settings are changed.

Such an editing apparatus, however, does not allow the settings for these function modes to be determined by viewing the icon 103 displayed on the effect track 101B. If the operator fails to be conscious that these function modes may have been set on, edited videos may deviate from what has been expected, thereby causing the operator to misunderstand that the apparatus is defective. In particular, key processing that superimposes two videos on each other is liable to cause misunderstanding depending on the settings.

Accordingly, if the editing apparatus enables easy determination of whether the video special-effect to be used is of the transition or animation type and of whether a particular function mode has been set on for the video special-effect processing, the work efficiency in creating an edit list can be improved.

SUMMARY OF THE INVENTION

In view of the foregoing, an object of this invention is to provide an edit list creating apparatus that can substantially improve the work efficiency in creating an edit list.

The foregoing object and other objects of the invention have been achieved by the provision of an edit list creating apparatus that can create an edit list and that is functional during the creation of the edit list for setting the list in such a way that desired video special-effect processing is executed by displaying a mark corresponding to the video special-effect processing at a desired position of a predetermined site of the edit list, comprising a display control means for having a display means display the mark with a predetermined display color that differs for each type of the video special-effect processing.

As a result, this edit list creating apparatus enables the type of video special-effect processing to be easily and instantaneously determined based on the color of the corresponding mark.

This invention also provides an edit list creating apparatus that can create an edit list and that is functional during the creation of the edit list for setting the list in such a way that desired video special-effect processing is executed by displaying a mark corresponding to the video special-effect processing at a desired position of a predetermined site of the edit list, comprising a display control means for having a display means display the mark corresponding to the video special-effect processing for which a predetermined function mode is set on, with a predetermined alarm color different from normal display colors.

As a result, this editing apparatus enables easy and instantaneous determination of whether the predetermined function mode has been set for the video special-effect processing, based on-the color of the corresponding displayed mark.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Configuration of an Editing Apparatus According to the Embodiment

Figure 1:
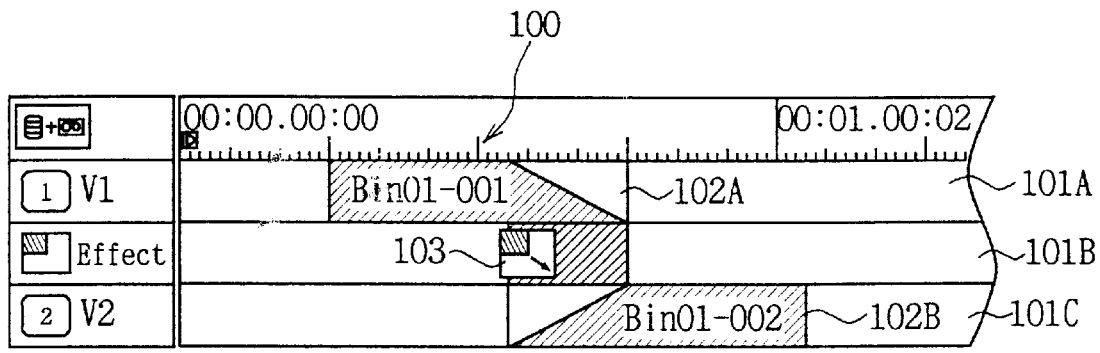
FIG. 1 is a schematic drawing showing an example of part of a configuration of an edit list creating screen in a conventional editing apparatus.
Figure 2A:
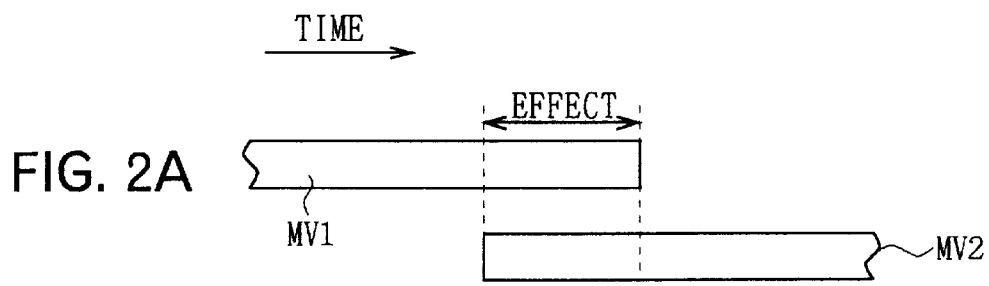
FIGS. 2A and 2B are conceptual drawings for describing the video special-effects for a transition and an animation types.
Figure 2B:
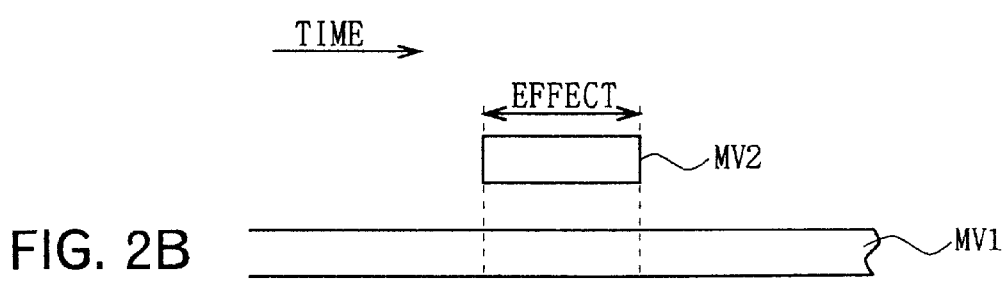
Figure 3:
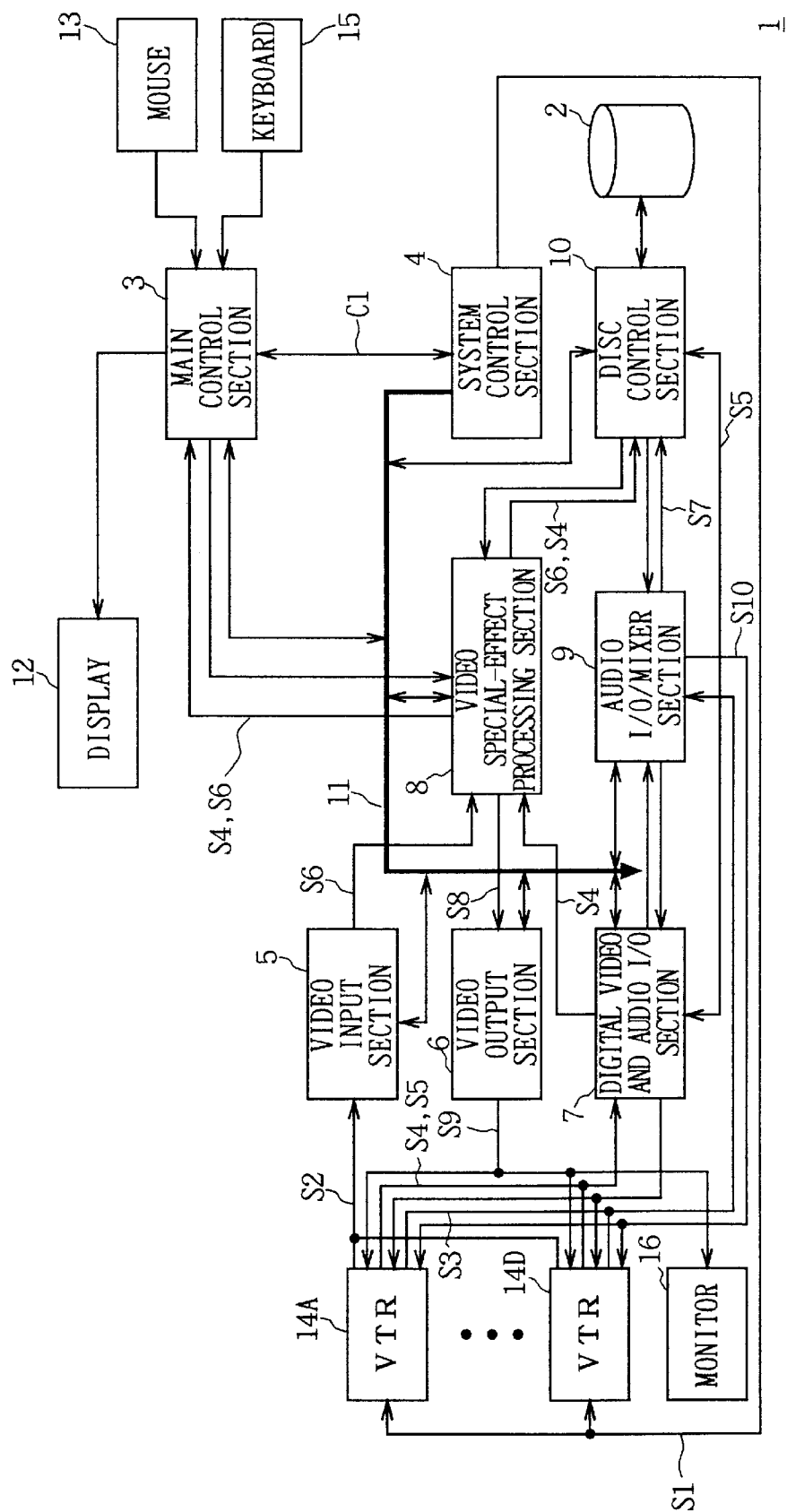
FIG. 3 is a block diagram showing the overall configuration of an editing apparatus according to this embodiment.

In FIG. 3, reference numeral 1 generally designates an editing apparatus according to this embodiment that is adapted to register as clips desired portions of videos and sounds recorded on a video tape and to download video and audio signals from desired clips into a hard disc device 2 at need.

The editing apparatus 1 is also adapted to create an edit list that defines edit contents and that is used to join the registered clips together into a desired state in order to obtain desired edited videos and sounds, and to actually execute edition according to the created edit list to obtain edited videos and sounds before recording them on a video tape.

That is, the editing apparatus 1 is configured by connecting together via a control bus 11, a main control section 3, a system control section 4, a video input section 5, a video output section 6, a digital video and audio I/O section 7, a video special-effect processing section 8, an audio I/O/mixer section 9, and a disc control section 10.

In this case, the main control section 3 initially has a display 12 display a predetermined operation screen (hereafter referred to as a "main screen"). In this state, when a mouse 13 is operated to select a clip registration mode and to input a reproduction operation instruction for one of a plurality of video tape recorders 14A to 14D connected to the editing apparatus 1, the main control section 3 sends out the corresponding control command C1 to the system control section 4.

Based on the supplied control command C1, the system control section 4 sends out a control signal S1 to the video tape recorder 14A to 14D to reproduce video and audio signals recorded on the video tape.

As a result, an analog video signal S2, an analog audio signal S3, a digital video signal S4, and a digital audio signal S5 are outputted from the video tape recorder 14A to 14D. The analog video and audio signals S2 and S3 are provided to the video input section 5 or audio I/O/mixer section 9, while the digital video and audio signals S4 and S5 are provided to the digital video and audio I/O section 7.

In this case, the system control section 4 controls via the control bus 11 either the video input section 5 and audio I/O/mixer section 9 or the digital video and audio I/O section 7 to load either the analog video and audio signals S2 and S3 or the digital video and audio signals S4 and S5 outputted from the video tape recorder 14A to 14D.

If the analog video signal S2 is loaded via the video input section 5 in this manner, the video input section 5 converts it into a digital video signal S6, which is then provided to the video special-effect processing section 8. If the digital video signal S4 is loaded via the digital video and audio I/O section 7, it is directly provided to the video special-effect processing section 8.

Under the control of the system control section 4, the video special-effect processing section 8 sends to the main control section 3 the digital video signals S6 and S4 supplied from the video input section 5 or digital video and audio I/O section 7. Then, the display 12 displays at a predetermined position on the main screen a video based on the digital video signals S6 and S4 under the control of the main control section 4.

In addition, if the analog audio signal S3 is loaded, it is directly sent out from the audio I/O/mixer section 9 to a speaker, which is not shown. In addition, if the digital audio signal S5 is loaded, the audio I/O/mixer section 9 converts it into an analog signal, which is then sent out to the speaker.

Thus, according to the editing apparatus 1, based on videos displayed on the display 12 and sounds outputted from the speaker, the operator can use the mouse 13 and a keyboard 15 to specify desired portions of the videos and sounds. Furthermore, using the specified portions as clips, related data such as time codes for the in and out points of the clips and the length of the materials (duration) can be registered in the main control section 3.

If a loading mode has been selected, the main control section 3 sends to the system control section 4 the control command C1 corresponding to this mode.

Based on the supplied control command C1, the system control section 4 sends out the control signal S1 to the corresponding video tape recorder 14A to 14D to allow this video tape recorder 14A to 14D to reproduce the videos and sounds of specified clips while controlling via the control bus 11 either the video input section 5 and audio I/O/mixer section 9 or the digital video and audio I/O section 7 to load either the analog video and audio signals S2 and S3 outputted from the video tape recorder 14A to 14D or the digital video and audio signals S4 and S5.

If the analog video signal S2 is then loaded via the video input section 5, the video input section 5 converts it into the digital video signal S6, which is then sent out to the disc control section 10 via the video special-effect processing section 8. If the digital video signal S4 is loaded via the digital video and audio I/O section 7, it is directly provided to the disc control section 10.

In addition, if the analog audio signal S3 is loaded via the audio I/O/mixer section 9, the audio I/O/mixer section 9 converts it into a digital audio signal S7, which is then sent out to the disc control section 10. If the digital audio signal S5 is loaded via the digital video and audio I/O section 9, it is directly provided to the disc control section 10.

Based on a command provided by the system control section 4 via the control bus 11, the disc control section 10 sequentially loads the digital video signals S6 and S4 provided by the video special-effect processing section 8 or digital video and audio I/O section 7 and the digital audio signals S7 and S5 provided by the audio I/O/mixer section 9 or digital video and audio I/O section 7. The disc control section 10 then provides these signals to the hard disc device 2 to record them at specified address positions of the hard disc.

As described above, the editing apparatus 1 is adapted to reproduce videos and sounds for specified clips from a video tape to load them in the hard disc device 2.

On the other hand, when clips are registered as described above, the main control section 3 displays a list of the registered clips in the main screen displayed on the display 12.

The operator can use the main screen to form into an edit list edit data that defines which and how clips are joined together. After or during the creation of the edit list, the operator can also check edited videos and sounds based on the list.

After or during the creation of the edit list, when a mode for previewing edited videos and sounds based on the list is selected, the main control section 3 sends out the corresponding control command C1 to the system control section 4.

Based on the control command C1, the system control section 4 sends out the control signal S1 to the corresponding video tape recorder 14A to 14D as required to allow this video tape recorder 14A to 14D to reproduce the videos and sounds of clips used for edition while controlling the disc control section 10 via the control bus 11 at need to reproduce from the hard disc device 2 the videos and sounds of the clips used for edition.

As a result, the analog video and audio signals S2 and S3 and digital video and audio signals S4 and S5 for the specified clips are outputted from the video tape recorder 14A to 14D. The analog video and audio signals S2 and S3 are provided to the video input section 5 or audio I/O/mixer section 9, while the digital video and audio signals S4 and S5 are provided to the digital video and audio I/O section 7.

In this case, the system control section 4 controls via the control bus 11 either the video input section 5 and audio I/O/mixer section 9 or the digital video and audio I/O section 7 to load either the analog video and audio signals S2 and S3 or the digital video and audio signals S4 and S5 outputted from the video tape recorder 14A to 14D.

If the analog video signal S2 is loaded via the video input section 5 in this manner, the video input section 5 converts it into the digital video signal S6, which is then provided to the video special-effect processing section 8. If the digital video signal S4 is loaded via the digital video and audio I/O section 7, it is directly provided to the video special-effect processing section 8.

Under the control of the system control section 4, the video special-effect processing section 8 special-effect-processes the digital video signals S6 and S4 for each of the supplied clips, into a specified state at need. The video special-effect processing section 8 also inserts among the digital video signals S6 and S4 for the clips, image data such as title characters and various graphics which are provided by the main control section 4 at need, or superimposes the image data on the digital video signals S6 and S4, in order to send out the resulting digital edited video signal S8 to the video output section 6.

Under the control of the system control section 4, the video output section 6 converts the supplied digital edited video signal S8 into an analog one that is an edited video signal S9. The edited video signal S9 is then sent out to a monitor 16.

On the other hand, of the analog and digital audio signals S3 and S5 outputted from the video tape recorder 14A to 14D, if the analog audio signal S3 is loaded via the audio I/O/mixer section 9, the audio I/O/mixer section 9 subjects this signal to edition processing such as mixing as required and then sends out the processed signal to speakers as an edit audio signal. If the digital audio signal S5 is loaded via the digital video and audio I/O section 7, the audio I/O/mixer section 9 converts this signal into an analog one, subjects this analog signal to edition processing such as mixing, and then sends out the processed signal to the speakers as an edit audio signal.

As a result, the editing apparatus 1 displays on the monitor 16 the edited video based on the edited video signal S9 and outputs from the speakers the edited sound based on the edited sound signal, thereby allowing the operator to check the edited video and sound based on the edit list.

Furthermore, after the edit list has been created and when the mouse 13 or keyboard 15 is operated to input a command for execution of the list, the main control section 3 sends out the corresponding control command C1 to the system control section 4.

Based on the supplied control command C1, the system control section 4 sends out the control signal S1 to the corresponding video tape recorder 14A to 14D as required to allow this video tape recorder 14A to 14D to reproduce the videos and sounds of clips used for edition while controlling the disc control section 10 via the control bus 11 at need to reproduce from the hard disc device 2 the videos and sounds of the clips used for edition.

As a result, as in the preview mode, the video tape recorder 14A to 14D provides the digital video signals S6 and S4 for the required clips to the video special-effect processing section 8 via the video input section 5 or digital video and audio I/O section 7, or the hard disc device 2 provides the digital video signals S6 and S4 for the required clips to the video special-effect processing section 8 via the disc control section 10.

In this case, the video tape recorder 14A to 14D provides the analog audio signals S3 or digital audio signals S5 for the required clips to the audio I/O/mixer section 9 directly or via the digital video and audio I/O section 7, or the hard disc device 2 provides the digital audio signals S7 and S5 for the required clips to the audio I/O/mixer section 9 via the disc control section 10.

Under the control of the system control section 4, similarly as in the preview mode, the video special-effect processing section 8 special-effect-processes the supplied digital video signals S6 and S4 for each clip as required, and sends to the video output section 6 the digital edited video signal S8 consisting of the video signals for the edited videos obtained.

Under the control of the system control section 4, the video output section 6 converts the supplied digital edited video signal S8 into an analog one and sends out the edit video signal S9 obtained to the corresponding video tape recorder 14A to 14D.

In this case, as in the preview mode, under the control of system control section, the audio I/O/mixer section 9 subjects the supplied analog audio signal S2 or digital audio signals S5 and S7 for each clip to edition processing such as mixing as required and then sends out the edit audio signal S10 obtained to the corresponding video tape recorder 14A to 14D.

Based on the control signal S1 provided by the system control section 4, the video tape recorder 14A to 14D records the edited video signal S9 supplied by the video output section 6 and the edit audio signal S10 supplied by the audio I/O/mixer section 9, on the video tape at specified locations.

In this manner, the editing apparatus 1 is adapted to edit and process into a specified state the videos and sounds of the clips specified according to the created edit list to record them on the video tape.

(2) Configuration of the Main Control Section

Figure 4:
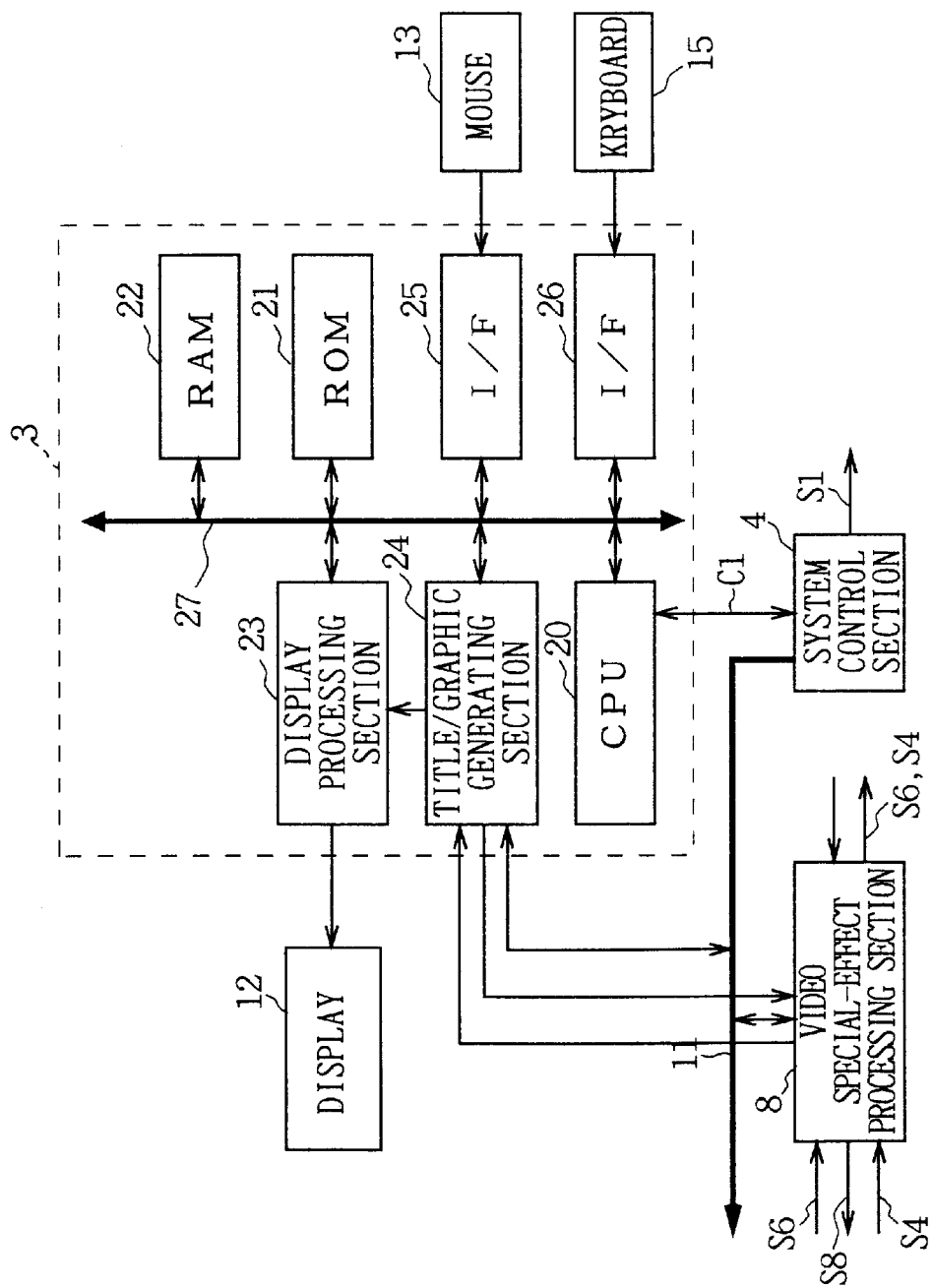
FIG. 4 is a block diagram showing a configuration of a main control section.

As shown in FIG. 4, the main control section 3 is composed of a CPU (Central Processing Unit) 20, a ROM (Read Only Memory) 21, a RAM (Random Access Memory) 22, a display processing section 23, a title/graphic generating section 24, interface circuits 25 and 26, and an SCSI (Small Computer System Interface) interface circuit 28, which are all connected together via a CPU bus 27, and is connected to the mouse 13 and keyboard 15 via the interface circuits 25 and 26 and to the hard disc device 17 via the SCSI interface circuit 28.

In this case, based on a program stored in the ROM 21, the CPU 20 reads out image data from the ROM 21 at need and provides it to the display 12 via the display processing section 23, so that the display 12 displays numbers or characters input via the main screen, various dialog boxes, a cursor moved through the main screen in response to mouse operations, and the keyboard 15 and displays in the main screen at specified locations, videos or still images based on the digital video signals S6 and S4 provided by the video special-effect processing section 8 to the display processing section 23 via the title/graphic generating section 24.

If, for example, the mouse 13 or the keyboard 15 is operated to supply a command for execution of predetermined processing to the CPU 20 via the interface circuits 25 and 26, then based on the program stored in the ROM 21, the CPU 20 sends out the control command C1 to the system control section 4 as required to allow the corresponding video tape recorder 14A to 14D, the video I/O section 5, the video output section 6, the digital video and audio I/O section 7, the video special-effect processing section 8, the audio I/O/mixer section 9, and/or the disc control section 10 to perform a predetermined operation via the system control section 4, thereby allowing the entire editing apparatus 1 to execute various processing such as those described above.

Furthermore, based on the program stored in the ROM 21, the CPU 20 controls as required the title/graphic generating section 24 to generate image data for title characters or graphics and then allows the video special-effect processing section 8 to send out this data, thereby reflecting these title characters and graphics in edited videos.

(3) Operational Procedure for the Main Screen

Figure 5:
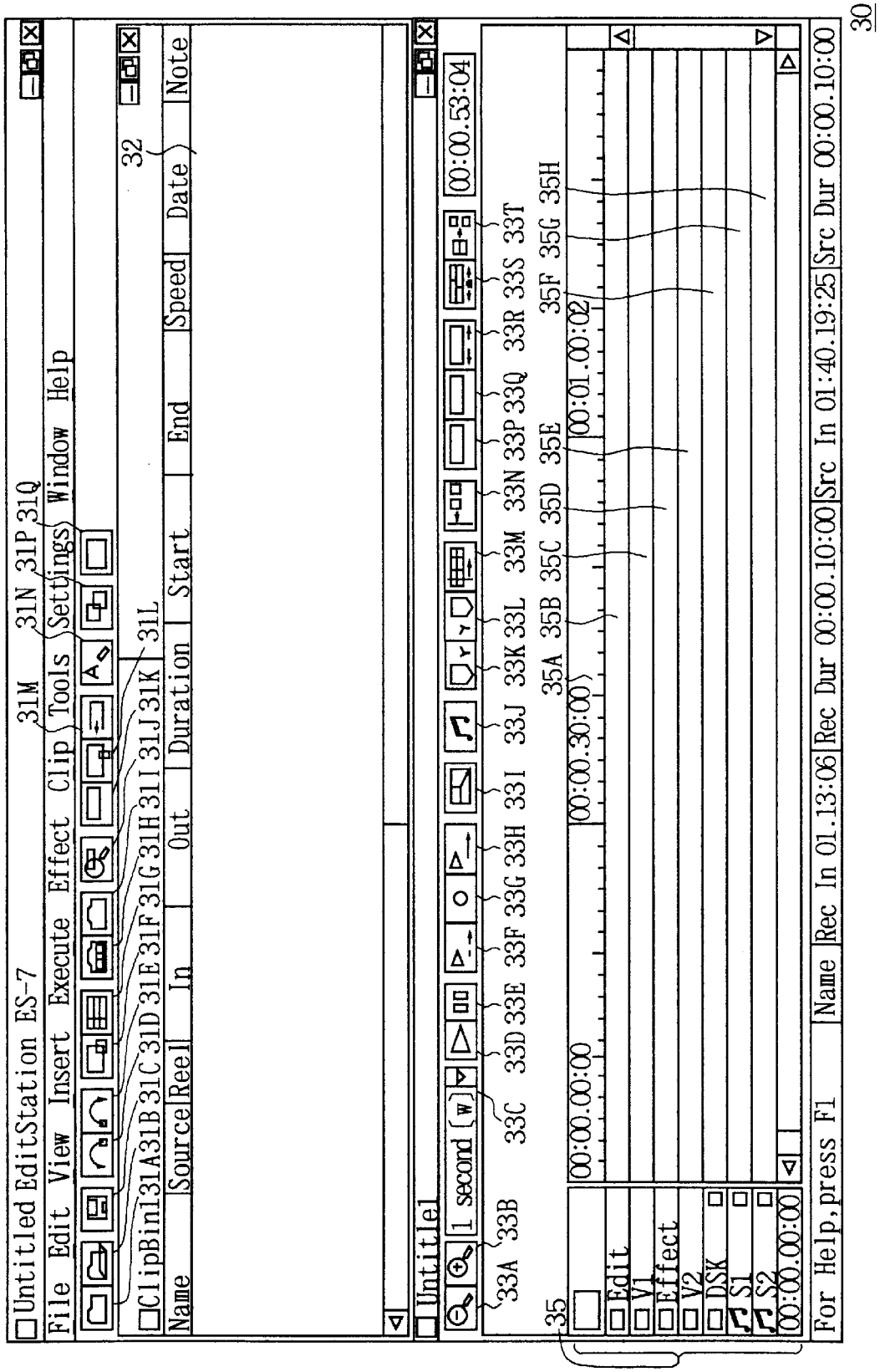
FIG. 5 is a schematic diagram showing a main screen.

During start-up following power-on, the CPU 20 displays a main screen 30 on the display 12 as shown in FIG. 5, based on the program stored in the ROM 21.

The main screen 30 has multiple buttons 31A to 31Q for selecting processing contents desired by the operator, a clip information display section 32 for displaying a list of registered clips, multiple buttons 33A to 33T for specifying various processing executed during creation of the edit list, and an edit list creation section 35 for creating the edit list.

Figure 6:
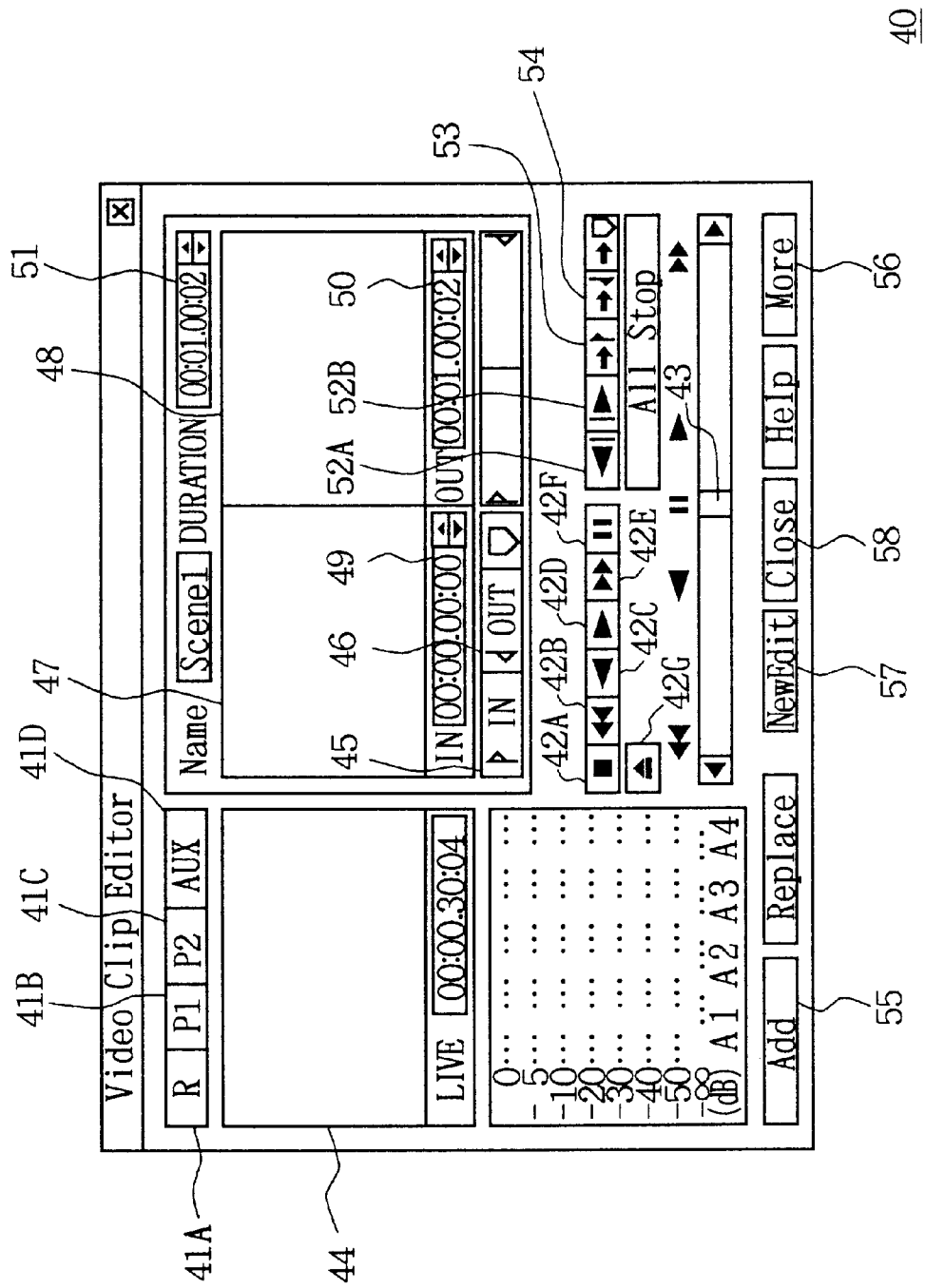
FIG. 6 is a schematic diagram showing a Video Clip Edit dialog box.

In the main screen 30, clicking a video clip edit button 31K at the top of the screen enables a dialog box 40, which is shown in FIG. 6 (hereafter referred to as a "Video Clip Edit dialog box"), to be superimposed on the main screen 30.

In this case, the Video Clip Edit dialog box 40 displays in the left at the top thereof multiple source selection buttons 41A to 41D corresponding to the video tape recorders 14A to 14D. By operating the mouse to click one of the source selection buttons 41A to 41D, a desired one of the video tape recorders 14A to 14D can be selected.

After selecting one of the source selection buttons 41A to 41D, the operator can click one of video operation buttons 42A to 42G displayed in the Video Clip Edit dialog box 40 in order to allow the corresponding video tape recorder 14A to 14D to perform an operation corresponding to the selected video operation button 42A to 42G. Dragging a slider 43 in the Video Clip Edit dialog box 40 also enables the corresponding video tape recorder 14A to 14D to perform a reproduction operation.

If the video tape recorder 14A to 14D has performed a reproduction operation or a variable-speed reproduction operation, a video reproduced from the video tape by the video tape recorder 14A to 14D is displayed in a live video display section 44 in the Video Clip Edit dialog box 40.

Thus, while visually checking the video displayed in the live video display section 44, the operator can click an in point specification button 45 or an out point specification button 46 to specify an in or out point of a portion of the video that is to be registered as a clip. The images specified as the in and out points are displayed in an in point image display section 47 and an out point image display section 48, respectively.

In addition, the time code in the video tape for the image specified as the in or out points are displayed in an in or out point time code display section 49 or 50, respectively, and the material length (duration) of a specified clip is displayed in a duration display section 51.

In the Video Clip Edit dialog box 40, clicking frame feed buttons 52A and 52B enables the video displayed in the live video display section 44 to be displayed while feeding the scenes in the forward or backward direction. In addition, clicking live video movement buttons 53 and 54 enables the image displayed in the live video display section 44 to be moved to the in or out point.

By specifying the in and out points of the clip as described above and then clicking a registration button 55, the operator can register the portion of the video between the in point and the out point as a clip.

Figure 7:
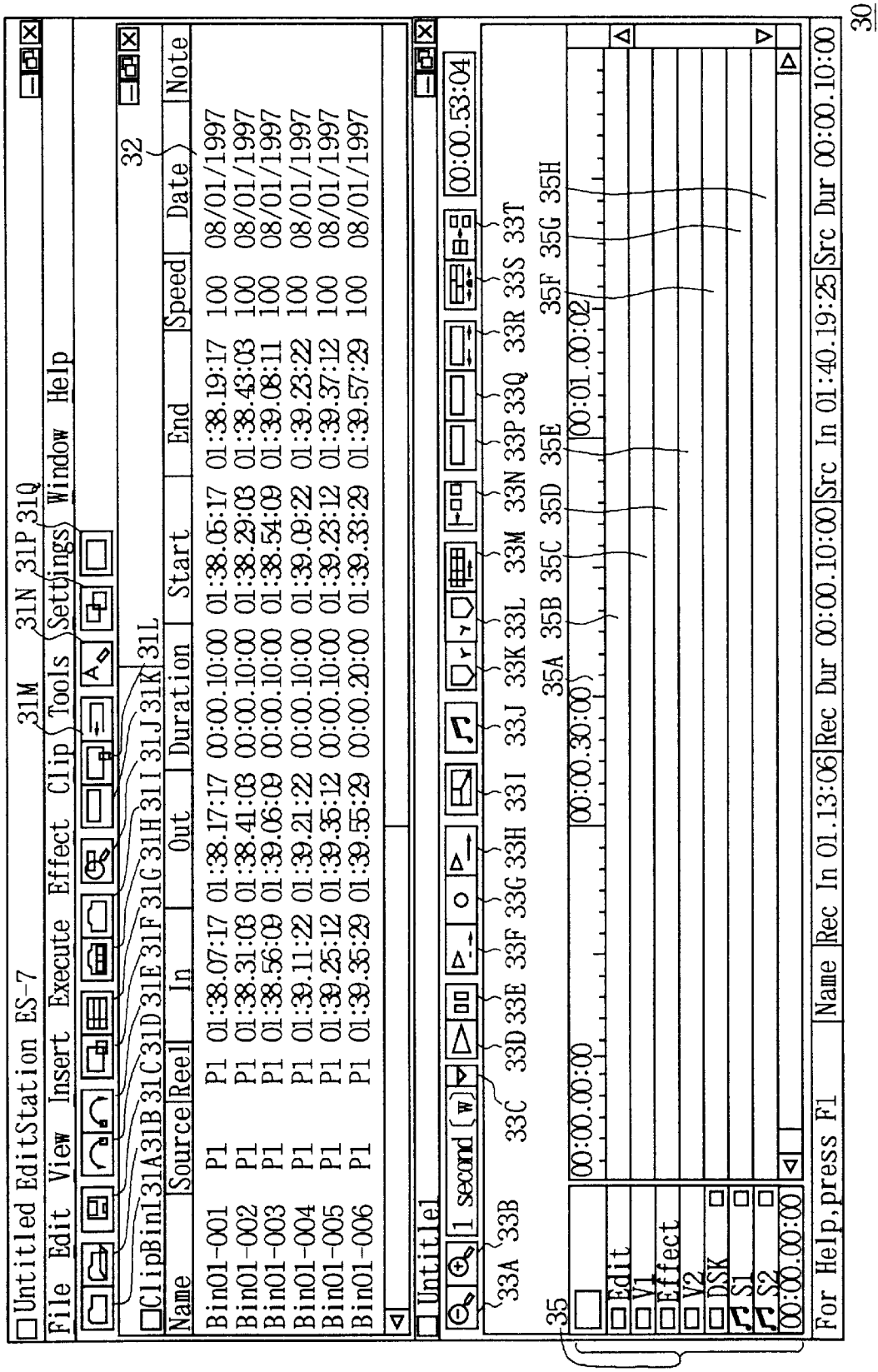
FIG. 7 is a schematic diagram showing the main screen.

Then, the time codes for the in and out points of the clip displayed in the display 12 and related data such as the material length and the saving position (in the video tape or the hard disc device 2) are loaded in the RAM 22 as a database. In addition, the time codes for the in and out points of the clip registered in this manner and the related data such as the material length are displayed in the clip information display section 32 of the main screen 30 as shown in FIG. 7.

Furthermore, if, for example, a loading mode has been selected on a setting screen (not shown) that can be opened by selecting a More button 56 in the Video Clip Edit dialog box 40, the video and sound of this clip are loaded in the hard disc device 2 as described above and data (for example, a flag) indicating that the clip is saved in the hard disc device 2 is stored in the database at a corresponding location.

As regards this, the editing apparatus 1 loads in the hard disc device 2 an extra amount of time (for example, 2 minutes) of video and audio signals located before and after the specified range of the clip (that is, between the in and out points). In addition, if, for example, a link mode has been selected on the setting screen, the video and sound are linked together as data and loaded in the hard disc device 2. If a non-link mode has been selected, the video and sound are loaded in the hard disc device 2 without linking them together as data.

In the Video Clip Edit dialog box 40, clicking a New Edit button 57 enables the apparatus to be returned to its initial state to enable the operator to sequentially register other clips using a procedure similar to that described above. In addition, the Video Clip Edit dialog box 40 can be closed by clicking the Close button 58.

On the other hand, while the list of the registered clips is being displayed in the clip information display section 32 of the main screen 30 as described above (FIG. 7), the operator can use the edit list creation section 35 of the main screen 30 to create an edit list using the following method.

In this case, the mouse is first operated to place the cursor on the row of a desired clip in the clip information display section 32, and the button of the mouse 13 is depressed to specify the one clip. In this state, using a time scale 35A in the edit list creation section 35 as an index, the cursor is moved to a desired location in a first or a second video track 35C or 35E, and the button of the mouse 13 is then released.

Figure 8:
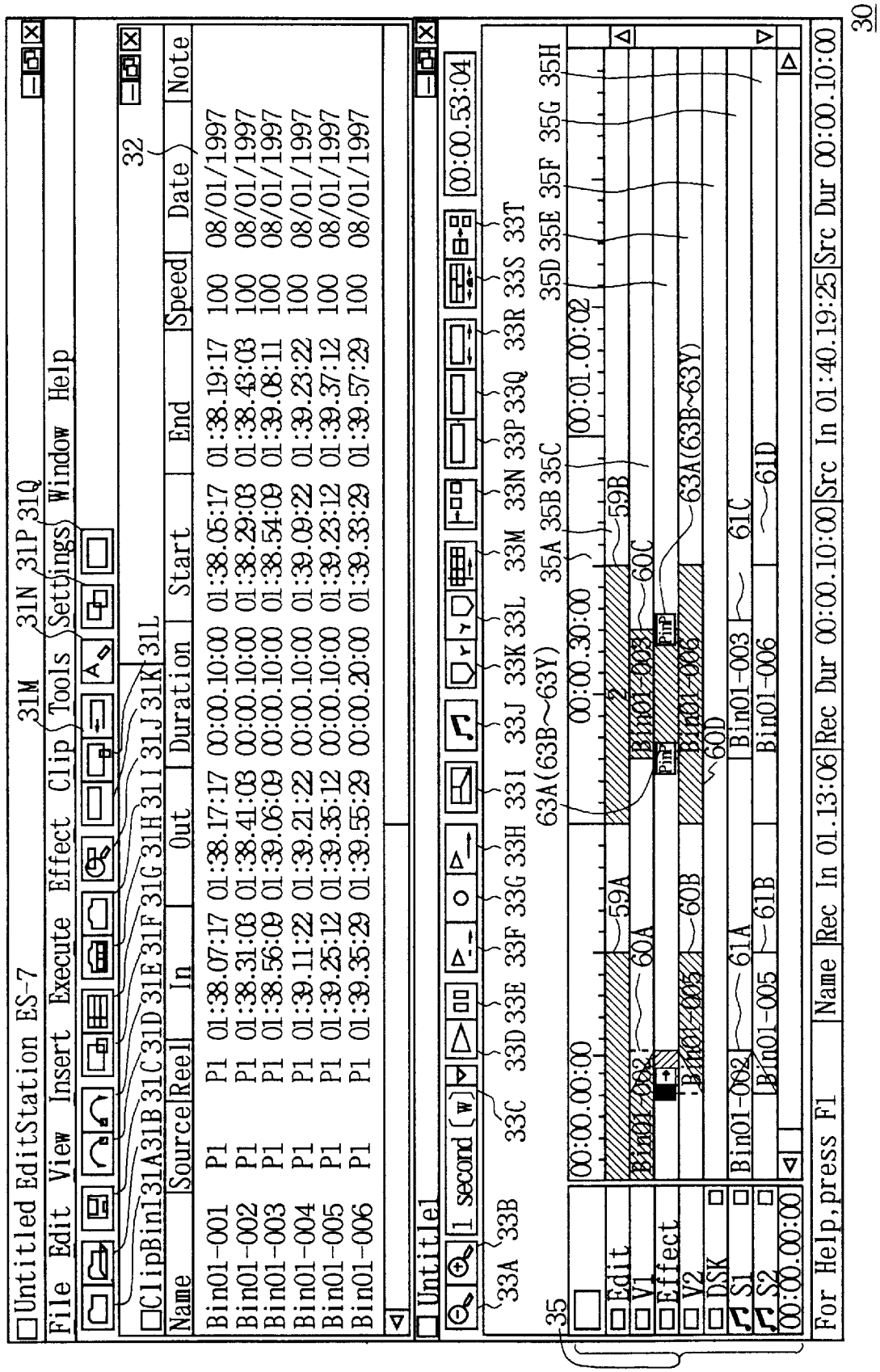
FIG. 8 is a schematic diagram showing the main screen.

As a result, a frame 60A to 60D having a length corresponding to the material length of the clip specified as described above is displayed in the first or second video track 35C or 35E starting at the current position of the cursor, as shown in FIG. 8. In addition, if the video and sound of this clip have been registered in such a way as to be linked together, a frame 61A to 61D having the same length as the frame 60A to 60D displayed in the first or second video track 35C or 35E is displayed in a first or a second audio tracks 35G or 35H corresponding to the first or second video track 35C or 35D with the frame 60A to 60D displayed therein and at the same position on the time scale 35A as the frame 60A to 60D.

The operator repeats the above operation to sequentially display the frames 60A to 60D and 61A to 61D in the first or second video track 35C or 35E and the first or second audio track 35G or 35H, respectively, so that the frames are continuous on the time scale 35A between the starting time code ("00:00.00:00") thereof and a-desired time code (that is, a desired amount of time).

Displaying the frames 60A to 60D and 61A to 61D in the first or second video track 35C or 35E and the first or second audio track 35G or 35H of the edit list display section 35, respectively, means that the video or sound of the clip corresponding to the frames 60A to 60D and 61A to 61D is displayed or outputted during the output of edited videos and sounds and during the time indicated on the time scale 35A. Thus, these operations enable creation of an edit list sequentially defining clip videos or sounds that are displayed as edited videos or outputted as edited sounds.

In addition, in creating an edit list in this manner, if, for example, the video special-effect processing is to be provided when the first clip video is switched to the second clip video (that is, the transition-type video special-effect processing is to be provided), the first frame 60A corresponding to the first clip is displayed on the first or second video track 35C or 35E while the second frame 60B corresponding to the second clip is displayed on the second or first video track 35E or 35C so that the time codes of a front portion of the first frame 60A and its rear portion match on the time scale 35A.

Subsequently, a select effect button 33R in the middle of the screen is clicked. This operation enables a predetermined dialog box 62 (hereafter referred to as a "Select Effect dialog box"), for example, the one shown in FIG. 9 to be displayed on the main screen 30 showing multiple icons 63A to 63Y (hereafter referred to as "effect icons") indicating the contents of various executable video special-effect processing.

The Select Effect dialog box 62 shows the various executable video special-effect processing classified into several types ("Cut," "Dissolve," "Wipe," "2D," "Screen," "3D," and "PinP") and includes tabs 64A to 64G corresponding to these types wherein one of the tabs 64A to 64G corresponding to a desired type can be clicked to display the effect icon 63A to 63Y for the corresponding type of video special-effect processing in the Select Effect dialog box 62 instead of the currently displayed effect icon 63A to 63Y.

After displaying the effect icon 63A to 63G for the desired transition-type video special-effect processing in the Select Effect dialog box as described above, the operator moves the cursor onto the effect icon 63A to 63G, and then depresses and holds the button of the mouse 13 while moving the cursor to the portion of the effect track 35D in the edit list creation section 35 in which the time codes of the first and second frames 60A and 60B match on the time scale 35A. The button of the mouse 13 is then released (drag and drop).

As a result, the dragged effect icon 63A to 63Y in the Select Effect dialog box 62 is displayed at the location at which it has been dropped after moving on the screen together with the cursor, wherein the icon appears to be glued to this position.

This enables the input of an instruction indicating that the video special-effect processing corresponding to the effect icon 63A to 63Y glued as described above should be executed at the junction between the video of the clip corresponding to the first frame 60A displayed on the first or second video track 35C or 35E and the video of the clip corresponding to the second frame 60B displayed on the second or first video track 35E or 35C.

On the other hand, for example, to provide video special-effect processing for temporarily displaying the video of a second clip during the video of a first clip (that is, to provide the animation-type video special-effect processing), the first frame 60D corresponding to the first clip is played on the first or second video track 35C or 35E while the second frame 60C corresponding to the second clip is displayed on the second or first video track 35E or 35C so as not to protrude out from the first frame 60D on the time scale.

Subsequently, a Select Effect button 33R in the middle of the screen is clicked to open the Select Effect dialog box 62, and the effect icon 63A to 63Y for the desired animation-type video special-effect processing is displayed in the Select Effect dialog box 62. Then, using the drag and drop technique, the effect icon 63A to 63Y is moved to and displayed on the time scale 35A at that location of the effect track 35D in the edit list creation section 35 which overlaps one end of the second frame 60C. Likewise, the same effect icon 63A to 63Y is moved to and displayed on the time scale 35A at that location of the effect track 35D in the edit list creation section 35 which overlaps the other end of the second frame 60C.

This enables the input of an instruction indicating that during the video of the clip corresponding to the first frame 60D displayed on the first or second video track 35C or 35E, the video of the clip corresponding to the second frame 60C displayed on the second or first video track 35E or 35C should be temporarily displayed using the video special-effect processing corresponding to the effect icon 63A to 63Y displayed on the effect track 35D in the edit list creation section 35.

The Select Effect dialog box 62 can be closed by clicking a Close button 65A of the multiple buttons 65A to 65E displayed in the right of the dialog box.

Furthermore, after or during the creation of the edit list, a Preview button 33D displayed in the middle of the main screen 30 can be clicked to select the preview mode in order to display on the monitor 16 (FIG. 3) edited videos based on the edit list while outputting from the speakers edited sounds based on the edit list, as described above.

In addition, after the edit list has been created as described above, a Record button 33G displayed in the middle of the main screen 30 can be clicked to select a record mode in order to execute edition processing based on the edit list, thereby recording the edited videos and sounds obtained on the video tape via previously specified video tape recorder 14A to 14D.

In addition to the above configuration, the editing apparatus 1 displays the effect icon 63A to 63Y for the transition-type video special-effect processing and the effect icon 63A to 63Y for the animation-type video special-effect processing with different colors on the main screen 30 and the Select Effect dialog box 62. This editing apparatus 1 enables the operator to easily and instantaneously determine based on the color of each effect icon 63A to 63Y whether the corresponding video special-effect processing is of the transition or animation type.

In this case, the editing apparatus 1 displays the effect icons 63A to 63Y corresponding to the transition-type video special-effect processing with blue except for their background (R=0, G=0, B=128) and the effect icons 63A to 63Y corresponding to the animation-type video special-effect processing with cyan except for their background (R=0, G=128, B=128).

In this manner, the editing apparatus 1 uses these colors of the same type to display the effect icons 63A to 63Y corresponding to the transition-type video special-effect processing with blue and the effect icons 63A to 63Y corresponding to the animation-type video special-effect processing with cyan so that these icons provide as similar impressions as possible.

Figure 10:
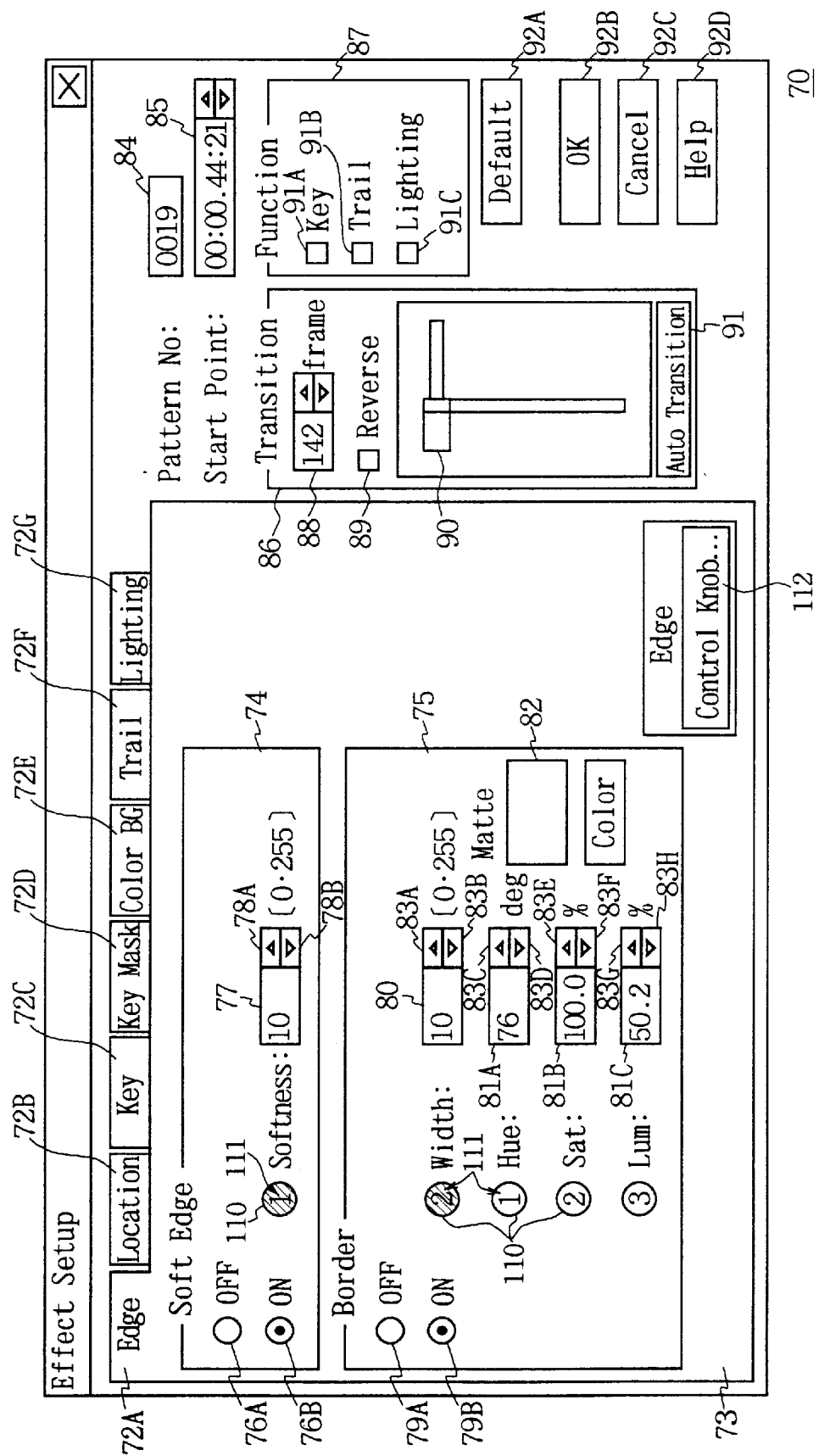
FIG. 10 is a schematic diagram showing an Effect Setup dialog box.

In addition, according to the editing apparatus 1, by double-clicking the effect icon 63A to 63Y that has been moved onto a user template 66 in the Select Effect dialog box 62 or onto the effect track 35D in the edit list creation section 35, an Effect Setup dialog box 70, which is shown in FIG. 10, can be superimposed on the main screen 30.

The operator can set or change various parameter values for video special-effect processing corresponding to the (double-clicked) effect icon 63A to 63Y specified using the Effect Setup dialog box 70 or can set or clear various function modes such as the key mode for displaying one video on another.

In this case, according to the editing apparatus 1, data indicating the presence of settings for the various parameter values and function modes provided as described above is stored and held in the RAM 22 of the main control section 3 and is subsequently used when this video special-effect processing is used.

Thus, according to the editing apparatus 1, if of these function modes, the key mode, which is particularly likely to be taken for a defect, has been set on, the effect icon 63A to 63Y for this video special-effect processing is displayed with an alarm color different from the normal colors (blue for the transition type and cyan for the animation type) when this effect icon is fixedly displayed on the effect track 35D in the edit list creation section 35 using the drag and drop technique.

Accordingly, the editing apparatus 1 enables the operator 1 to easily and instantaneously determine whether the key mode is set on for the corresponding video special-effect processing, based on the display color of the effect icon 63A to 63Y displayed on the effect track 35D in the edit list creation section 35. This configuration can prevent defects in edited videos caused by an inappropriate setting for the key mode.

According to this embodiment, if the Effect Setup dialog box 70 (FIG. 10) described later is used to set the key mode on for the corresponding video special-effect processing while the effect icon 63A to 63Y is fixedly displayed on the effect track 35D in the edit list creation section 35, the effect icon 63A to 63Y is displayed with the same alarm color as described above when the Effect Setup dialog box 70 is closed.

In this case, magenta (R=128, G=0, B=128) is used as such an alarm color whether the video special-effect processing is of the transition or animation type. Thus, if the key mode has been set on, the corresponding effect icon 63A to 63Y is displayed with magenta except for its background when the effect icon 63A to 63Y is fixedly displayed on the effect track 35D in the edit list creation section 35 or when the Effect Setup dialog box 70 is closed.

(4) Various Detailed Settings for Video Special-effect Processing

According to the editing apparatus 1, by double-clicking the effect icon 63A to 63Y that has been moved onto the user template 66 in the Select Effect dialog box 62 or onto the effect track 35D in the edit list creation section 35, the Effect Setup dialog box 70 shown in FIG. 10 can be superimposed on the main screen 30.

In this case, the Effect Setup dialog box 70 has multiple tabs 72A to 72G, and by operating the mouse to select a desired one of the tabs 72A to 72G, the various parameter values corresponding to the tabs 72A to 72G can be set and changed or the various function modes can be set and cleared.

If, for example, the edge tab 72A is selected in the Effect Setup dialog box 70, a soft edge setting column 74 and a border setting column 75 are displayed in a setting contents display section 73 as shown in FIG. 10. At this point, the soft edge setting column 74 shows "OFF" and "ON" characters and a first and a second selection buttons 76A and 76B, only one of which can be turned on so as to correspond to these characters.

The operator can operate the mouse to select either the first or second selection button 76A or 76B; for example, selecting the second selection button 76B enables execution of soft edge processing (for example, vignetting the border between two videos during wiping or the edge of a line displayed in the border between two videos) to be set.

In addition, if the second selection button 76B in the soft edge setting column 74 is selected, a value for a range of the video to be vignetted (a parameter value) can be input via the keyboard 15 (FIG. 3), and the input parameter value is displayed in a softness setting display section 77. This parameter value can be freely increased or reduced between 0 and 255 using the corresponding up and down button 78A or 78B.

Selection of the edge tab 72A also displays in the border setting column 75 the "OFF" and "ON" characters and a first and a second selection buttons 79A and 79B, only one of which can be turned on so as to correspond to these characters.

The operator can operate the mouse to select either the first or second selection button 79A or 79B; for example, selecting the second selection button 79B enables execution of border display processing (for example, displaying a line in the border between two videos during wiping) to be set.

If the second selection button 79B in the border setting column 75 is selected, the keyboard 15 can be used to set parameter values such as the width, hue, saturation, and luminance of the line. The input parameter values are displayed in a width setting display section 80, a hue setting display section 81A, a saturation setting display section 81B, and a luminance setting display section 81C, and a color based on the hue, saturation, and luminance set in this manner is displayed in a color setting display section 82. The parameter values displayed in the width setting display section 80, the hue setting display section 81A, the saturation setting display section 81B, and the luminance setting display section 81C can be freely increased or reduced using the corresponding up or down buttons 83A to 83H.

Figure 9:
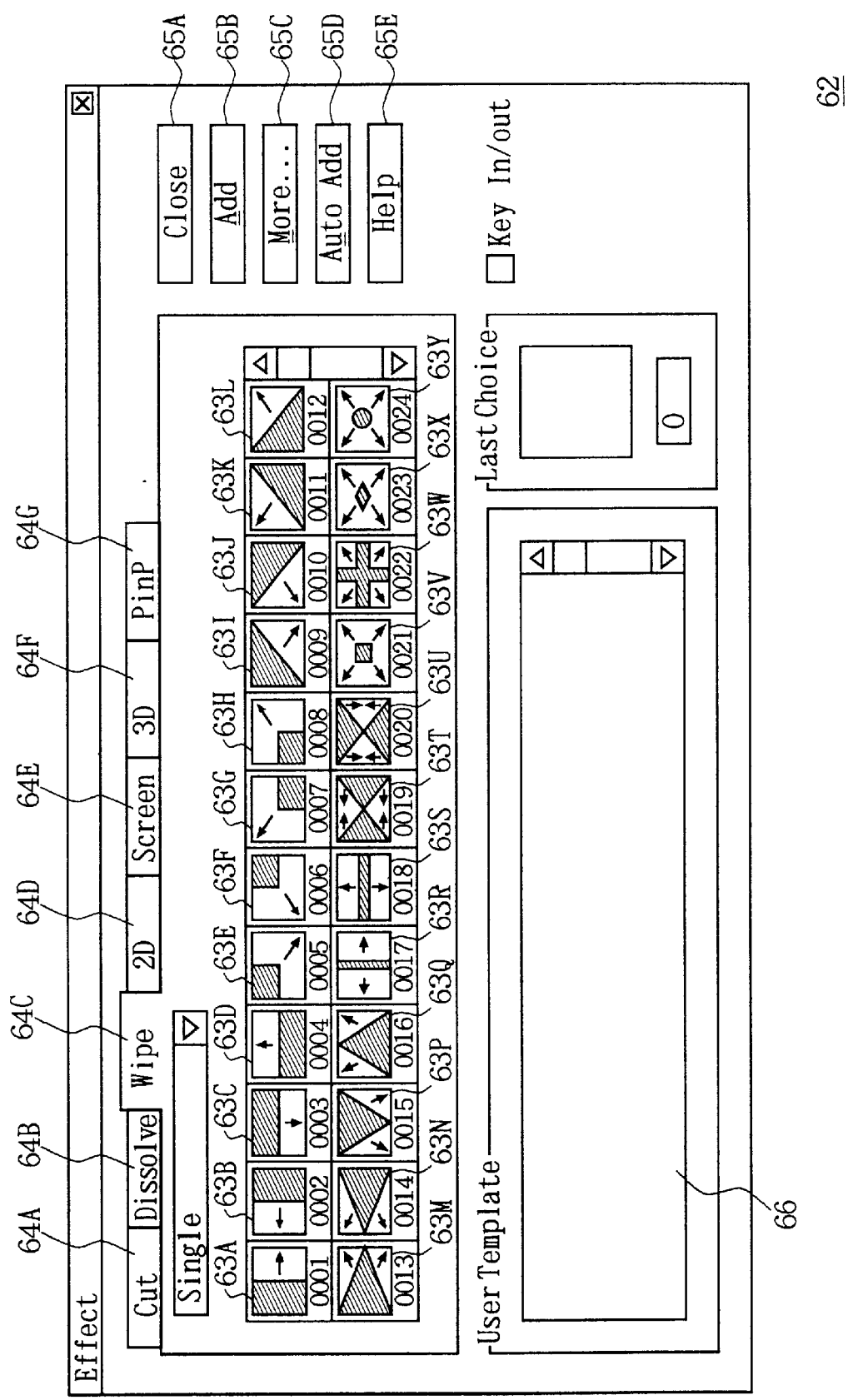
FIG. 9 is a schematic diagram showing a Select Effect dialog box.

On the other hand, the number of the effect icon 63A to 63Y (a pattern number that is a value displayed under the effect icons 63A to 63Y in FIG. 9) that has been specified (double-clicked) to open the Effect Setup dialog box 70 and the leading time code (start point) of this effect icon 63A to 63Y on the effect track 35D in the edit list creation section 35 are displayed in a pattern number display section 84 and a start point display section 85 in the right of the Effect Setup dialog box 70, regardless of the type of the selected tab 72A to 72G.

A transition setting display column 86 and a function setting display column 87 are also displayed in the right of the Effect Setup dialog box 70. The transition setting display column 86 shows therein a frame number display section 88 showing the number of frames to be subjected to the video special-effect processing corresponding to the effect icon 63A to 63Y, a reverse check box 89 for setting or clearing a reverse mode in which the monitor displays special-effect-processed videos, an auto reverse transition button 91 for inputting a command for reproduction of special-effect-processed videos during a reverse mode, and an adjustment bar 90 for adjusting the reproduction speed.

Furthermore, a first to a third check boxes 91A to 91C for setting or clearing key, trail, and lighting processing are displayed in the function setting display column 87. To set a desired function mode, the inside of a corresponding one of the first to third check boxes 91A to 91C is clicked. As a result, a check mark 92 is displayed inside one of the first to third check boxes 91A to 91C that has been clicked, thereby setting its function mode on.

To clear the function mode that has been set on, the corresponding one of the first to third check boxes 91A to 91C for which the check mark 92 has been displayed is clicked. As a result, the check mark 92 is deleted to set this function mode off.

Furthermore, a Default button 93A, an OK button 93B, a Cancel button 93C, and a Help button 93D are displayed in the lower right of the Effect Setup dialog box 70. In the Effect Setup dialog box 70, clicking, for example, the Default button 93A enables the parameter values displayed in the setting display sections 74 and 75 of the setting contents display column 73 to be returned to their initial values.

In addition, clicking the OK button 93B enables the parameter values set in the setting contents display column 73 to be loaded, stored, and held, followed by closing of the Effect Setup dialog box 70. The settings for the various parameter values or function modes stored and held in this manner are reflected during the subsequent edition processing.

Furthermore, in the Effect Setup dialog box 70, clicking the Cancel button 93C enables discarding of all the various function modes or parameter values set or input using the Effect Setup dialog box 70 (without changing set modes or parameter values as internal processing), followed by closing of the Effect setup dialog box 70. Moreover, clicking the Help button 93D enables predetermined help information to be superimposed on the Effect Setup dialog box 70.

(5) Various Processing Procedures used by the CPU 20

Figure 11:
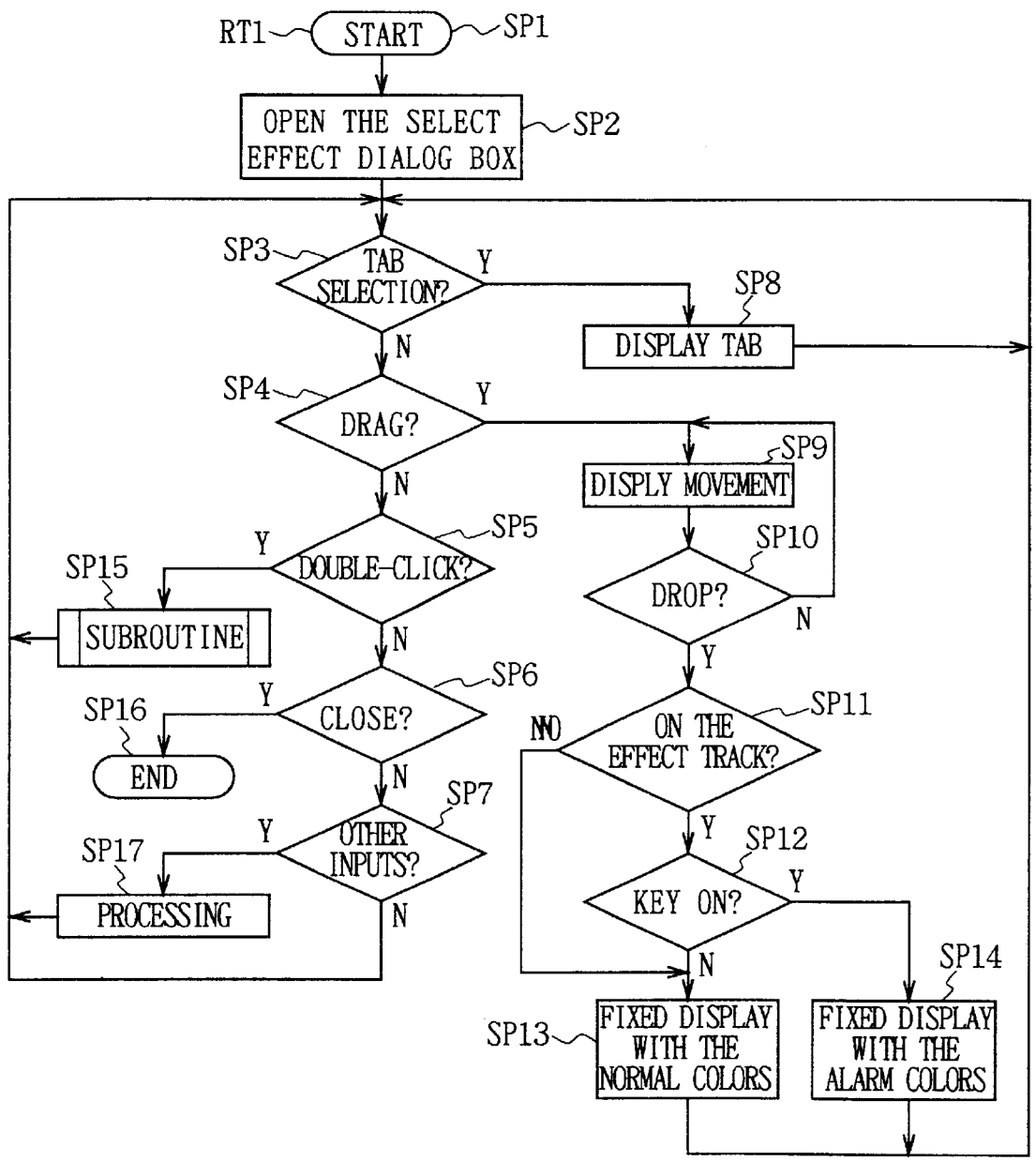
FIG. 11 is a flowchart showing a Select Effect dialog box processing procedure.

The CPU 20 of the main control section 3 executes the above processing in the Select Effect dialog box 62 according to a Select Effect dialog box processing procedure RT1, which is shown in FIG. 11.

In an edit list creation mode, when the Select Effect button 33R in the main screen 30 is clicked, the CPU 20 starts the Select Effect dialog box processing procedure RT1 at step SP1 and subsequently superimposes the Select Effect dialog box 62 on the main screen 30 at step SP2.

In this case, based on the image data for each effect icons 63A to 63Y for the video special-effect processing stored in the Ram 22, with respect to the effect icons 63A to 63Y to be displayed in the Select Effect dialog box 62 in its initial state after opening, the CPU 20 displays the effect icons 63A to 63Y for the transition-type video special-effect processing with blue and the effect icons 63A to 63Y for the animation-type video special-effect processing with cyan.

The CPU 20 then proceeds to step SP3, and during steps SP3 to SP7, sequentially determines whether any one of tab 64A to 64G has been selected, whether any effect icon 63A to 63Y displayed on the user template 66 in the Select Effect dialog box 62 has been dragged, whether any effect icon 63A to 63Y displayed in the Select Effect dialog box 62 has been double-clicked, whether the Close button 65A in the Select Effect dialog box 62 has been clicked, and whether there have been any other inputs provided by clicking any other buttons 65B to 65E.

If the CPU 20 obtains negative results in all steps SP3 to SP7, it returns to step SP3 to repeat a loop of steps SP3-SP4-SP5-SP6-SP7-SP3 until it obtains a positive result in one of these steps SP3 to SP7.

In contrast, if the CPU 20 obtains a positive result in step SP3, the CPU 20 proceeds to step SP8 to display the tab 64A to 64G and then returns to step SP3. In this case, based on the image data for each effect icon 63A to 63Y stored in the RAM 22, the CPU 20 displays the effect icons 63A to 63Y for the transition-type video special-effect processing with blue at the corresponding locations in the Select Effect dialog box 62 and the effect icons 63A to 63Y for the animation-type video special-effect processing with cyan at the corresponding locations in the Select Effect dialog box 62.

In addition, if the CPU 20 obtains a positive result in step SP4, it proceeds to step SP9 to display the corresponding effect icon 63A to 63Y so as to appear to move on the main screen 30 integrally with the cursor. In addition, if at step SP10, the CPU 20 determines whether the effect icon 63A to 63Y has been dropped to obtain a negative result, it returns to step SP9 and repeats a loop of steps SP9-SP10-SP9 until it obtains a positive result in step SP10.

When the CPU 20 finally obtains a positive result in step SP10, it proceeds to step SP11 to determine whether the effect icon 63A to 63Y has been dropped on the effect track 35D in the edit list creation section 35 of the main screen 30. If the result is negative, the CPU 20 proceeds to step SP13, and otherwise, it proceeds to step SP12 to determine whether the key mode has been set on for the video special-effect processing corresponding to the effect icon 63A to 63Y.

If the CPU 20 obtains a negative result in step SP12, it passes to step SP13 to fixedly display the effect icon 63A to 63Y at the dropped position with the normal colors, and then returns to step SP3. Otherwise, it proceeds to step SP14 to display the effect icon 63A to 63Y with magenta, and then returns to step SP3.

Figure 12:
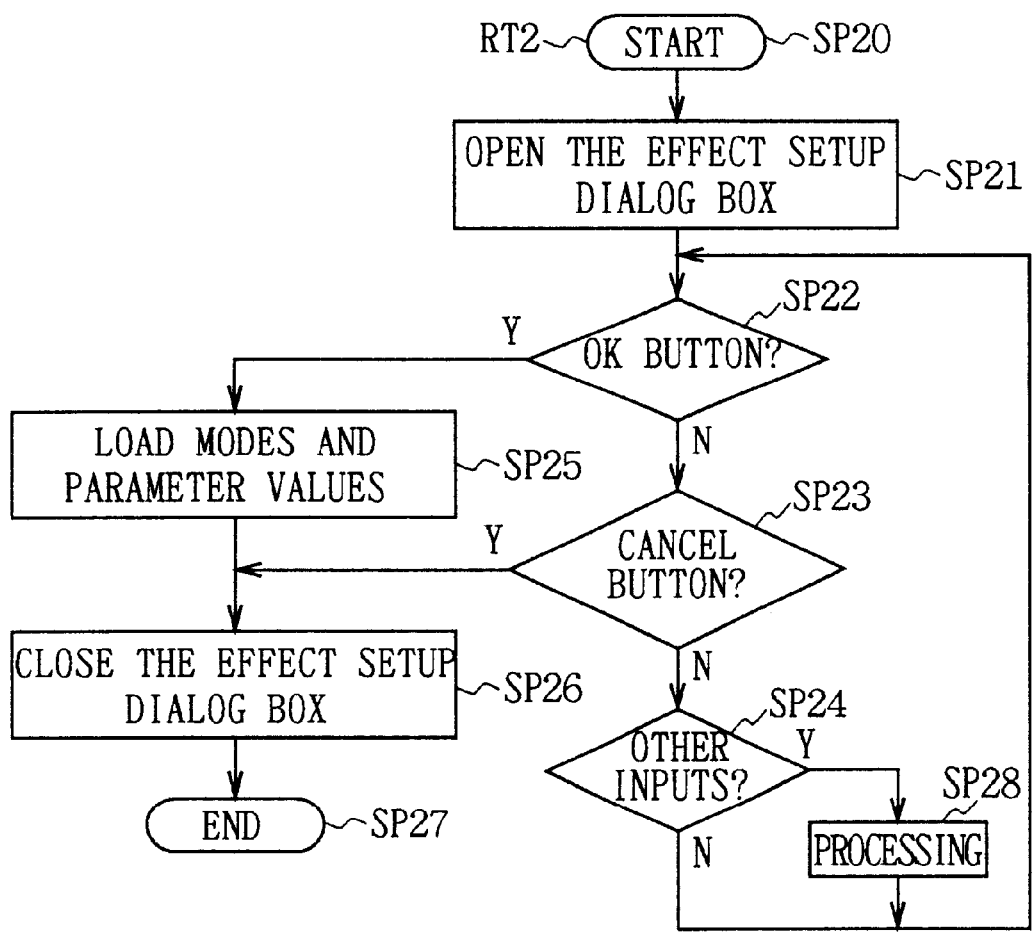
FIG. 12 is a flowchart showing a first Effect Setup dialog box processing procedure.

On the other hand, if the CPU 20 obtains a positive result in step SP5, it proceeds to step SP15 to select a first Effect Setup dialog box processing procedure RT2, which is shown in FIG. 12. The CPU 20 then executes the above various processing in the Effect Setup dialog box 70 according to the Effect Setup dialog box processing procedure RT2, and then returns to step SP3.

In addition, if the CPU 20 obtains a positive result in step SP, it transfers to step SP16 to close the Select Effect dialog box 62 and then finishes the Select Effect dialog box processing procedure RT1. If the result of step SP7 is positive, it proceeds to step SP17 to execute the corresponding processing and then returns to step SP3.

If the CPU 20 has selected the first Effect Setup dialog box processing procedure RT2 in step SP16 (FIG. 12), it starts this procedure in step SP20 and subsequently superimposes the Effect Setup dialog box 70 on the main screen 30 in step SP21.

In this case, based on the various data for the video special-effect processing stored in the RAM 22, the CPU 20 displays the various set parameter values in the corresponding display sections 77, 80, and 81A to 81C (FIG. 10). If any function mode has been set, it displays the check mark 92 in the corresponding check box 91A to 91C (FIG. 10).

The CPU 20 subsequently passes to step SP22 and during steps SP22 to SP24, sequentially determines whether the OK button 93B in the Effect Setup dialog box 70 has been clicked, whether the Cancel button 93C has been clicked, and whether there have been any other inputs provided by clicking any other buttons 93C or 93D or inputting any other parameter values.

Once the CPU 20 has obtained negative results in all steps SP22 to SP24, it returns to step SP22 to repeat a loop of steps SP22-SP23-SP24-SP22 until it obtains a positive result in one of these steps SP22 to SP24.

On the contrary, if the CPU 20 obtains a positive result in step SP22, it proceeds to step SP25 to load in the RAM 22 the various parameter values set using the Effect Setup dialog box 70 and data indicating the presence of settings for the various function modes. It then transfers to step SP26 to close the Effect Setup dialog box 70 and then passes to step SP27 to finish the first Effect Setup dialog box processing procedure RT1.

In addition, if the result of step SP 23 is positive, the CPU 20 proceeds to step SP26, and if the result of step SP24 is positive, it passes to step SP28 to execute the corresponding processing and then returns to step SP22.

Figure 13:
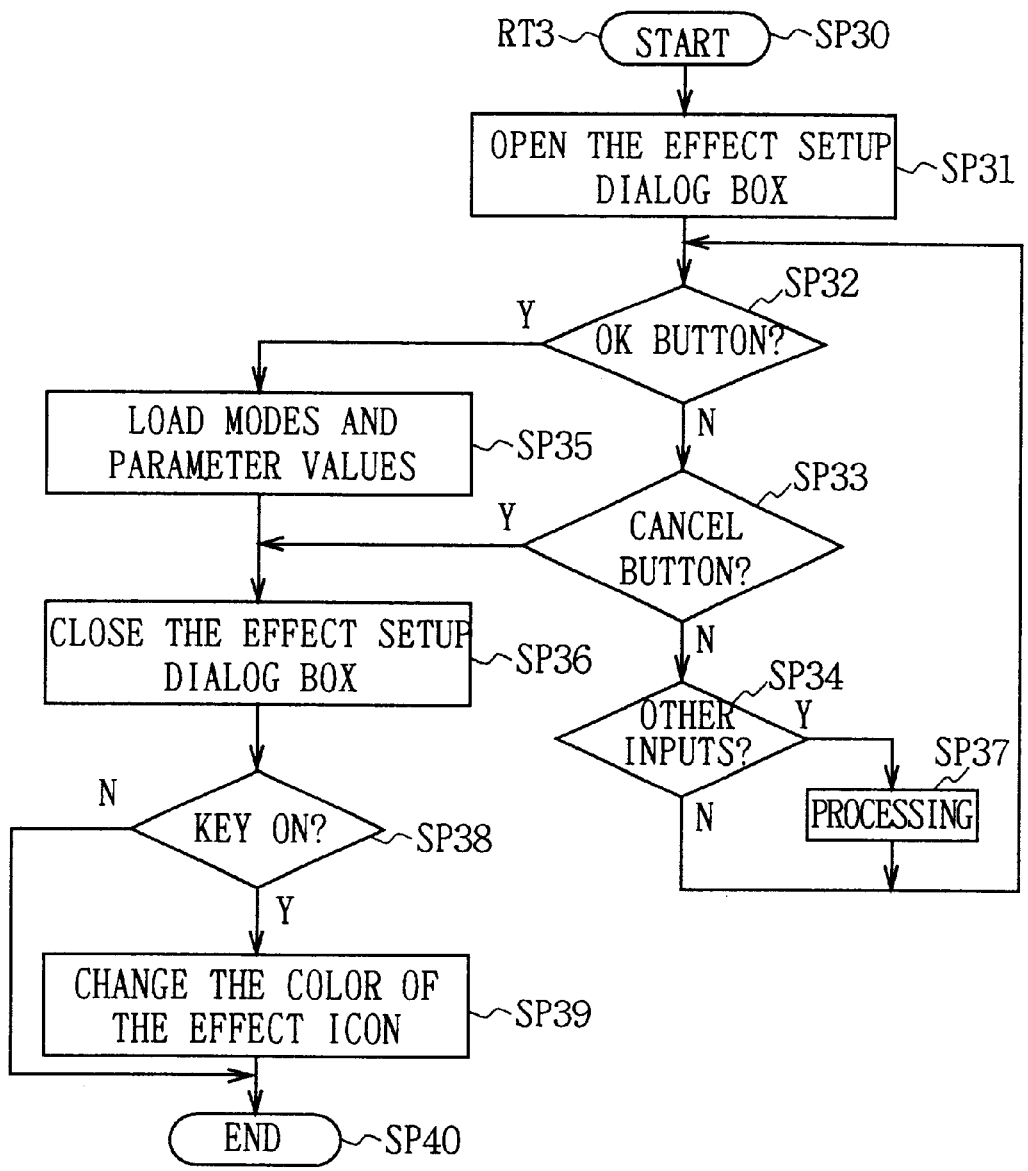
FIG. 13 is a flowchart showing a second Effect Setup dialog box processing procedure.

On the other hand, if, for example, the effect. icon 63A to 63Y displayed on the effect track 35D in the edit list creation section 35 of the main screen 30 is double-clicked in the edit list creation mode, the CPU 20 executes the above various processing according to a second Effect Setup dialog box processing procedure RT3 shown in FIG. 13.

That is, when the effect icon 63A to 63Y displayed on the effect track 35D in the edit list creation section 35 of the main screen 30 is double-clicked, the CPU 20 starts the second Effect Setup dialog processing procedure RT3 in step SP30 and subsequently sequentially process steps SP31 to SP37 as in steps SP21 to SP26 and SP28 of the first Effect Setup dialog box processing procedure RT2 (FIG. 12).

If the CPU 20 has closed the Effect Setup dialog box 70 in step SP36, it proceeds to step SP38 to determine whether the key mode has been set on for the video special-effect processing.

If the result of step SP38 is positive, the CPU 20 passes to step SP39 to change the display color of the effect icon 63A to 63Y to magenta except for its background and then transfers to step SP40 to finish the second Effect Setup dialog box processing procedure RT3. In addition, if the result of step SP38 is negative, the CPU 20 directly proceeds to step SP40 to finish the second Effect Setup dialog box processing procedure RT3.

(6) Operation and Effects of this Embodiment

According to the above configuration, in the edit list creation mode of the editing apparatus 1, the Select Effect dialog box 62 can be opened by clicking the Select Effect button 33R in the main screen 30, and execution of desired video special-effect processing can be set by using the drag and drop technique to move one of the effect icons 63A to 63Y displayed in the Select Effect dialog box 62 which corresponds to this video special-effect processing to a predetermined position on the effect track 35D in the edit list creation section 35 of the main screen 30 in order to display this effect icon in such a way as to be glued to this position.

In this case, on the main screen 30 and the Select Effect dialog box 62, the editing apparatus 1 displays the effect icons 63A to 63Y for the transition-type video special-effect processing with blue and the effect icons 63A to 63Y for the animation-type video special-effect processing with cyan.

In addition, the effect icon 63A to 63Y corresponding to the video special-effect processing for which the key mode is set on is displayed with magenta when this effect icon is dropped onto the effect track 35D in the edit list creation section 35 or when the Effect Setup dialog box 70 is closed.

Consequently, the editing apparatus 1 enables the operator to easily and instantaneously determine based on the display color of the effect icon 63A to 63Y whether the video special-effect processing corresponding to the effect con 63A to 63Y is of the transition or animation type and whether the key mode has been set on for the video special-effect processing corresponding to the effect icon 63A to 63Y, thereby facilitating edit list creating operations.

According to the above configuration, the effect icons 63A to 63Y for the transition-type video special-effect processing and the effect icons 63A to 63Y for the animation-type video special-effect processing are displayed with different colors on the main screen 30 and the Select Effect dialog box 62. This feature enables easy and instantaneous determination of whether the corresponding video special-effect processing is of the transition or animation type, based on the display color of each effect icon 63A to 63Y, thereby providing an editing apparatus that can substantially improve the work efficiency in creating the edit list.

In addition, the effect icon 63A to 63Y corresponding to the video special-effect processing for which the key mode is set on is displayed with the alarm color different from the normal colors when this effect icon is dropped onto the effect track 35D in the edit list creation section 35 or when the Effect Setup dialog box 70 is closed. This feature enables easy and instantaneous determination of whether the key mode has been set on, based on the display color of the effect icon 63A to 63Y on the effect track 35D in the edit list creation section 35, thereby providing an editing apparatus that can substantially improve the work efficiency in creating the edit list.

(7) Other Embodiments

Note that, in the above embodiment, this invention is applied to the editing apparatus 1 configured as shown in FIG. 3. However, this invention is not limited thereto but is applicable to edit list creating apparatuses of various other configurations that can create an edit list that defines edit contents used to join a plurality of registered image materials together in order to obtain desired edited videos and that are functional during the creation of the edit list for setting the list in such a way that desired video special-effect processing is executed by displaying a mark corresponding to the video special-effect processing at a desired position of a predetermined site of said edit list.

In addition, in the above embodiment, the effect icons 63A to 63Y shown in FIG. 9 are applied as marks that differ for each video special-effect processing and that are used to recognize and identify the video special-effect processing set in the edit list. However, this invention is not limited thereto but marks of various other forms are applicable.

Furthermore, according to the above embodiment, the CPU 20 of the main control section 3 for controlling the entire editing apparatus 1 is applied as the display control means for having the display 12 that is the display means for displaying the predetermined edit list creation screen (the main screen 30 according to this embodiment) used to create the edit list, display the effect icons 63A to 63Y with the colors differing for each type of video special-effect processing. This invention, however, is not limited to this aspect but such a display control means may be provided separately from the CPU 20.

Moreover, according to the above embodiment, the various video special-effect processing are classified into the transition and animation types, and the effect icons 63A to 63Y corresponding to these two types are displayed with the different display colors. This invention, however, is not limited to this aspect but a method different from the classification into the transition and animation types may be used to classify the various video special-effect processing into a plurality of types with each type displayed with a different color. In this case, colors of the same type may also be used to display these types in order to allow the effect icon for each type to provide a similar impression.

Furthermore, in the above embodiment, the effect icons 63A to 63Y corresponding to the transition-type video special-effect processing is displayed with blue and the effect icons 63A to 63Y corresponding to the animation-type video special-effect processing is displayed with cyan. However, this invention is not limited thereto but various other display colors are applicable.

Furthermore, according to the above embodiment, the CPU 20 of the main control section 3 for controlling the entire editing apparatus 1 is applied as the display control means for having the display 12 that is the display means for displaying the predetermined edit list creating screen (the main screen 30 according to this embodiment) used to create the edit list, display the effect icon 63A to 63Y corresponding to the video special-effect processing for which the key mode is set on, with the alarm color different from the normal display colors. This invention, however, is not limited to this aspect but such a display control means may be provided separately from the CPU 20.

Moreover, although the above embodiment has been described in conjunction with the display of the effect icon 63A to 63Y corresponding to the video special-effect processing for which the key mode is set on, with the alarm color different from the normal display colors, this invention is not limited to this aspect but is applicable to function modes other than the key mode. The latter configuration provides effects similar to those of the above embodiment.

Furthermore, according to the above embodiment, the effect icon 63A to 63Y corresponding to the video special-effect processing for which the key mode is set on is displayed with the alarm color when this effect icon is displayed on the effect track 35D in the edit list creation section 35 of the main screen 30. This invention, however, is not limited to this aspect but the effect icon may be displayed with the alarm color in other than the effect track 35D.

Moreover, according to the above embodiment, the effect icon 63A to 63Y corresponding to the video special-effect processing for which the key mode is set on is displayed with magenta whether this processing is of the transition or animation type. This invention, however, is not limited to this aspect but may display the effect icon with a color other than magenta.

In addition, in this case, the transition and animation types may be displayed with different alarm colors, and if the alarm colors for the transition and animation types are of the same type as the normal display colors for these types, the effect track 35D in the edit list creation section 35 of the main screen 30 can be used to easily and instantaneously determine whether the video special-effect processing with the key mode set on therefor is of the transition or animation type.

As described above, the edit list creating apparatus that can create the edit list and that is functional during the creation of the edit list for setting the list in such a way that desired video special-effect processing is executed when the mark corresponding to the video special-effect processing is displayed at the desired position of the predetermined site of the edit list, comprises the display control means for displaying the mark with the predetermined display color that differs for each type of the video special-effect processing. This configuration enables the type of video special-effect processing to be easily and instantaneously determined based on the display color of the corresponding mark, thereby providing an edit list creating apparatus that can substantially improve the work efficiency in creating the edit list.

The edit list creating apparatus that can create the edit list and that is functional during the creation of the edit list for setting the list in such a way that desired video special-effect processing is executed when the mark corresponding to the video special-effect processing is displayed at the desired position of the predetermined site of the edit list, comprises the display control means for displaying the mark corresponding to the video special-effect processing for which the predetermined function mode is set on, with the predetermined alarm color different from the normal display colors. This configuration enables easy and instantaneous determination of whether the predetermined function mode have been set on for the video special-effect processing, based on the color of the mark, thereby providing an edit list creating apparatus that can substantially improve the work efficiency in creating the edit list.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An edit list creating apparatus capable of creating an edit list that defines edit contents used to join a plurality of registered image materials together in order to obtain desired edited videos and of, at the time of creating of the edit list, setting the list in such a way that desired video special-effect processing is executed by displaying a mark corresponding to the video special-effect processing at a desired position of a predetermined site of said edit list, said edit list creating apparatus comprising:

display means for displaying a predetermined edit list creating screen for creating said edit list; and display control means for having said display means display said mark with a predetermined display color except for the background of said mark that differs for each type of said video special-effect processing.

2. The edit list creating apparatus according to claim 1, wherein said display colors for said marks differing for each type of said video special-effect processing are of the same type of color.

3. The edit list creating apparatus according to claim 1, wherein said display control means has said display means display said mark corresponding to said video special-effect processing for which a predetermined function mode is set on, in said predetermined site of said edit list with a predetermined alarm color different from said display color.

4. The edit list creating apparatus according to claim 3, wherein said predetermined function mode comprises a key mode for displaying videos based on two said image materials in such a way as to overlap each other.

5. An edit list creating apparatus capable of creating an edit list that defines edit contents used to join a plurality of registered image materials together to obtain desired edited videos and of, at the time of creating the edit list, setting the list in such a way that desired video special-effect processing is executed by displaying a mark corresponding to the video special-effect processing at a desired position of a predetermined site of said edit list, said edit list creating apparatus comprising:

display means for displaying a predetermined edit list creating screen for creating said edit list; and display control means for having said display means display said mark corresponding to said video special-effect processing for which a predetermined function mode is set on, with a predetermined alarm color different from normal display colors.

6. The edit list creating apparatus according to claim 5, wherein said predetermined function mode comprises a key mode for displaying videos based on two said image materials in such a way as to overlap each other.

* * * * *